United States Patent
Phukan

(10) Patent No.: US 12,045,791 B2
(45) Date of Patent: Jul. 23, 2024

(54) ZERO CLIENT SELF-SERVICE TERMINAL (SST) WITH MIDDLEWARE DELIVERED SERVICES

(71) Applicant: NCR Voyix Corporation, Atlanta, GA (US)

(72) Inventor: Gautam Phukan, Telangana (IN)

(73) Assignee: NCR Voyix Corporation, Atlanta, GA (US)

( * ) Notice: Subject to any disclaimer, the term of this patent is extended or adjusted under 35 U.S.C. 154(b) by 36 days.

(21) Appl. No.: 16/912,064

(22) Filed: Jun. 25, 2020

(65) Prior Publication Data

US 2021/0406851 A1    Dec. 30, 2021

(51) Int. Cl.
*G06Q 20/18* (2012.01)
*G06F 9/455* (2018.01)
*G06Q 20/10* (2012.01)

(52) U.S. Cl.
CPC ......... *G06Q 20/18* (2013.01); *G06F 9/45558* (2013.01); *G06Q 20/1085* (2013.01); *G06F 2009/45562* (2013.01); *G06F 2009/45579* (2013.01); *G06F 2009/45595* (2013.01)

(58) Field of Classification Search
CPC ............... H04L 27/26134; G06F 9/466; G06F 9/45558; G06F 2009/45583; G06F 2009/4557; G07F 19/206; G07F 19/211; G06Q 30/06; G06Q 20/108
See application file for complete search history.

(56) References Cited

U.S. PATENT DOCUMENTS

| 8,201,732 | B1* | 6/2012 | Kropf | G07F 19/211 |
| | | | | 235/382 |
| 2002/0152180 | A1* | 10/2002 | Turgeon | H04L 9/3226 |
| | | | | 705/72 |
| 2006/0273151 | A1* | 12/2006 | Block | G07F 19/209 |
| | | | | 235/379 |
| 2008/0263363 | A1* | 10/2008 | Jueneman | H04L 9/0877 |
| | | | | 713/184 |
| 2015/0178803 | A1* | 6/2015 | Joy | G06Q 30/0281 |
| | | | | 705/26.41 |
| 2015/0188992 | A1 | 7/2015 | Ayanam et al. | |
| 2017/0223856 | A1* | 8/2017 | Rohan | H02J 9/06 |
| 2018/0285124 | A1* | 10/2018 | Whytock | G06F 9/541 |

(Continued)

FOREIGN PATENT DOCUMENTS

SK    8605 Y1    11/2019

OTHER PUBLICATIONS

EP Search Report—Sep. 21, 2021.

*Primary Examiner* — Mahran Y Abu Roumi
(74) *Attorney, Agent, or Firm* — Schwegman Lundberg & Woessner, P.A.

(57) ABSTRACT

An ultra-thin Self-Service Terminals (SSTs) is provided. The ultra-thin SST lacks an Operating System (OS). When the ultra-thin SST is powered on, firmware of the ultra-thin SST connects to a virtualized environment over a first network connection and a Virtual Machine (VM) instance having the OS is loaded within the virtualized environment. The OS of the VM instance obtains middleware services from a second network connection to a middleware environment. The middleware services provided authentication, management, and audit services for the VM instance based on the ultra-thin SST.

12 Claims, 3 Drawing Sheets

(56) References Cited

U.S. PATENT DOCUMENTS

2019/0371132 A1* 12/2019 Hecker .................. G06F 9/466
2020/0120092 A1 4/2020 Van Rotterdam et al.
2021/0083911 A1* 3/2021 Morozov ............ H04L 27/2014

* cited by examiner

ZERO CLIENT SELF-SERVICE TERMINAL (SST) WITH MIDDLEWARE DELIVERED SERVICES

BACKGROUND

Self-Service Terminals (SST) are popular with a variety of industries, such as Financial Institutions (FIs) and retailers. SSTs permit customers to perform transaction without employ assistance of an enterprise.

One type of SST is the ubiquitous Automated Teller Machine (ATM). ATMs used by banks are customized computers that contain hard disks to sustain operating systems (OS) and customer applications for maintenance and troubleshooting of the ATMs. From a hardware prospective, an ATM entails a large investment to support and resolve customer issues. The needed investment often requires human resources for activities that include offline diagnostics, replacement of hardware faults, software repairs, and re-installation of ATM images to restore ATM services.

ATM hardware manufacturing requires hard disk drives and Digital Versatile Disk (DVD) RW+ (Read/Write) drives to deploy an ATM image. Furthermore, maintenance of ATMs are difficult when the ATMs are located in remote geographic locations.

As a result, there are multiple issues associated with providing, maintaining, and supporting ATMs. These issues comprise: increased manufacturing costs associated with hardware; procurement of integrated peripheral devices and DVD RW+ drives; governmental fees (duties) associated with the shipping weights of the ATM and/or peripheral devices; procurement, installation, and configuration of the needed OSs for the ATMs; and retention of trained support staff to deal with online real-time diagnosis of problems encountered while operating the ATMs after the ATMs are deployed to a site of the FI.

SUMMARY

In various embodiments, methods and a system for operating a zero-client Self-Service Terminal (SST) with middleware delivered services.

According to an embodiment, a method for operating a zero-client SST with middleware delivered services. For example, a network connection is established with an ultra-thin Self-Service Terminal (SST). An Operating System (OS) for the ultra-thin SST is loaded in memory that is remoted located from the ultra-thin SST. Device drivers associated with peripheral devices interfaced to the ultra-thin SST are loaded. A second network connection is established with a middleware service provider and processing a Virtual Machine (VM) instance for the ultra-thin SST is processed with the OS and device drivers processed remotely from the ultra-thin SST and with middleware services provided to the OS of the VM instance over the second network connection.

DETAILED DESCRIPTION

Figure 1:
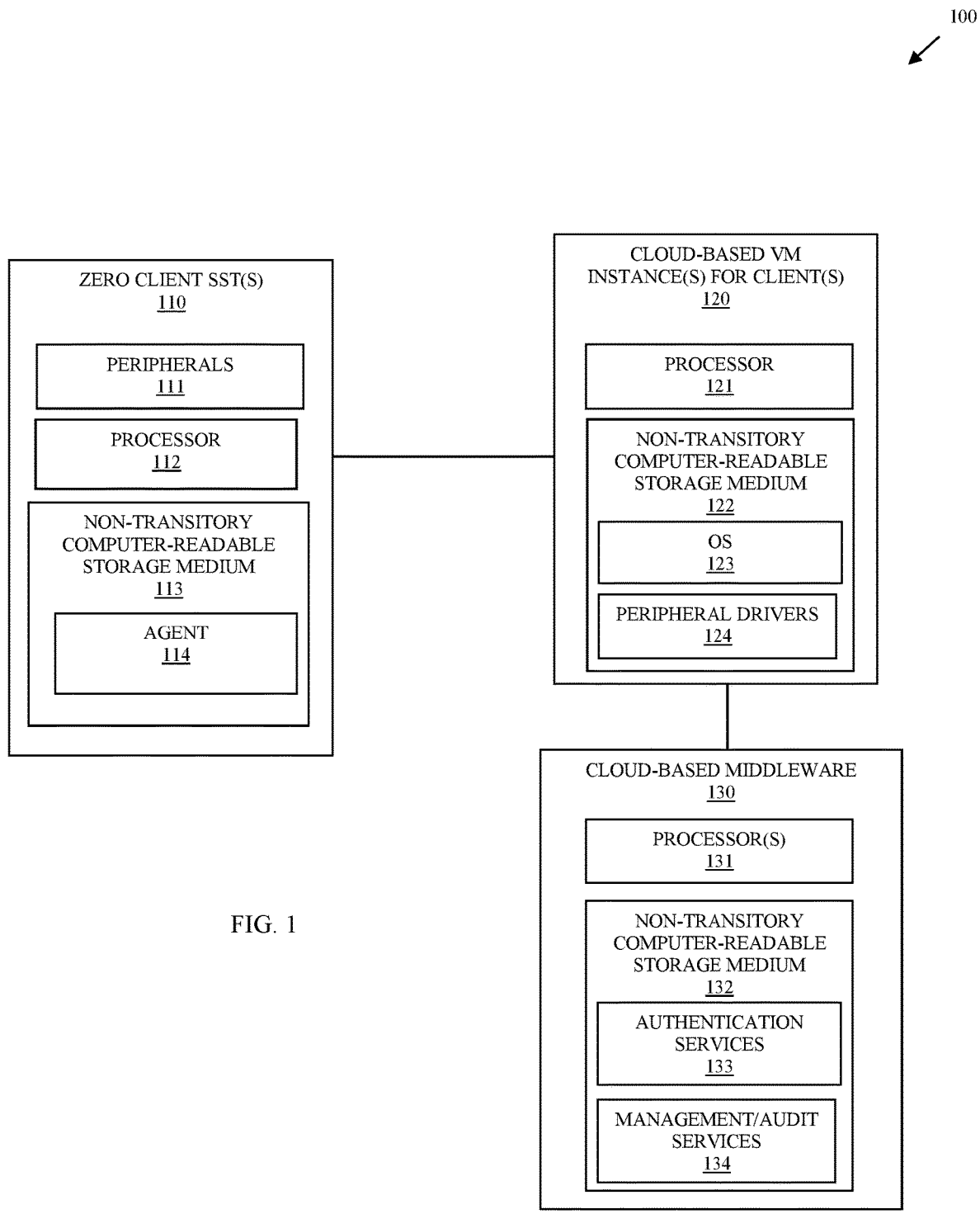
FIG. 1 is a diagram of a system for a zero-client SST with middleware delivered services, according to an example embodiment.

FIG. 1 is a diagram of a system 100 for a zero-client SST with middleware delivered services, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of processing zero-client SSTs with middleware delivered services, presented herein and below.

As used herein a "zero client" is an ultra-thin client that does not even includes its own Operating System (OS) on the client device. The OS and all processing is delivered over a network from a cloud/server. All processing performed by the client and performed on behalf of the client takes place on the cloud/server. The processor of the client is specifically configured to process a given protocol and, perhaps process a Graphical User Interface (GUI) that permits a network connection to the client and decodes display data sent from a cloud/server for presentation on a display of the client, and sends input data provided through a peripheral to the client to the cloud/server.

"Middleware services" are applications (apps) that provide feature and function beyond that which is available in a native OS of a computing device. Essentially, middleware services are software glue between a client's OS and its connected cloud/server.

As will be discussed more completely herein and below, the system 100 permits a zero-client SST with middleware delivered services to provide instances of SST Virtual Machines (VMs) that are cloud hosted while each SST VM instance is separately delivered needed authentication and management services from a middleware cloud. This retains security, maintenance, and recovery services of each SST without the typically required onsite specialized SST hardware and software that would normally in-person and dedicated support personnel to maintain.

The system includes one or more zero-client SSTs 110, a cloud-host server that hosts VM instances of each SST 120, and a separate cloud-based server that hosts middleware used by each VM instance 130.

Each zero-client SST 110 comprises a variety of peripheral devices 111, a processor 112, and a non-transitory computer-readable storage medium 113 comprising executable instructions representing an agent 114.

Each VM instance 120 that corresponds to a given zero-client SST 110 includes hardware that supports the VM instance that comprises, a processor 121 and a non-transitory computer readable storage medium 122 comprising executable instructions representing an OS 123 and peripheral drivers 124 that support the corresponding SST's peripheral devices 111.

The cloud-based middleware 130 also include hardware that supports middleware services delivered to each OS 123 of each SST VM instance 120; this hardware includes a processor 131 and a non-transitory computer-readable storage medium 132 comprising executable instructions representing authentication services 133 and management/audit services 134.

When a given SST 110 is powered on, a network connection is established via firmware of the zero-client SST 110, the firmware processed by processor 112. A corresponding OS 123 for the VM instance 120 associated with the zero-client SST 110 is then loaded into memory by processor 121 from the medium 122 of the cloud/server associated with the VM instance 120. The OS 123 receives from the processor 112 (executing the firmware of zero-client SST 110), peripheral device identifiers and peripheral device types, OS 123 then loads the corresponding peripheral device drivers 124 into memory for interaction by OS 123. Any transaction-based interface associated with the zero-client SST is also loaded into memory by the OS 123 and processed from the VM instance 120. The OS 123 also requests configured middleware services over a network connection from a middleware service for loading and initiating the authentication services 133 and management/audit services 134 for processing within the context of the VM instance 120.

Authentication services 133 and management/audit services 134 perform processing for the VM instance 120 of the zero-client SST 110 comprising:
1. Authorized plug-in or access of a registered device via a preconfigured device identifier (ID) and/or manufacturer ID only.
2. Automatic integration with known VM hosting platforms such as—VMWare®, Citrix®, and Microsoft Azure® for deploying the running VM instance 120 from hosting platform to cloud-based SST.
3. Very quick and automated restoration mechanism of VM instance's virtualized environment in minutes from a last snapshot stored in the SST's hosted cloud VM environment, in case of application or virtualized VM instance 120 crash is detected.
4. Realtime diagnose of all the connected peripheral devices 111 of zero-client SST 110 in case of any hardware fault is detected based on device operation status with customer specific or default interval (e.g., 30 minutes).
5. Automated email (may be mandatory) and SMS text (Short Messaging Service—optional) triggers facility in-case of hardware failure is detected as per point 3 to email recipients configured by customer so that defective part can be replaced on time and due to hardware fault, cloud SST VM instance 120 displays static message—"Out of Service".
6. Red alert flag message via email and SMS to authorized personnel of enterprise or customer when there is communication break or there is a detection of security breach either by unauthorized device plug-in or trying to break physical security measures of SST VM instance 120 and zero-client SST 110 will terminate the virtual loaded environment and displays static message—"Out of Service" until the necessary actions are taken by customer.
7. Two-factor authentications is performed at SST VM instance 120 either remotely or locally by authorized personnel of customer or authorized customer engineer at zero-client SST's location (note that this two-factor authentication is provided through authentication services 133).
8. Flexible scaling up feature is available to add multiple license keys to use middleware features with SST VM instance 120 head count limit so that customer will be able to add later additional procured cloud VM instances of the zero-client SST 110 from the appropriate provider without modifying any original license keys for the middle ware services.

The middleware authentication services 133 and management/audit service may further include added features comprising:
1. A support authorized key feature that allows the customer and enterprise support staff to know the level of support provided from the enterprise for the zero-client SST 110 with the cloud-based hosted SST VM instance 120 and the corresponding middleware services from the middleware environment 130.
2. Two-factor authentications for remote access of middleware services and diagnoses—One Time Password (OTP) from customer and OTP from an enterprise representative for a middleware console remote access feature for online diagnose of the SST VM instance 120 issue(s) remotely and a log uploading by the enterprise support representative with auto-mailing of log files to authorized and registered enterprise representatives based on Case ID generated and stored in middleware environment 130.
3. Inclusion of additional personnel such as professional services of the enterprise in Case ID for simultaneous online access or support of new product deployment in SST VM instance 120, which greatly reduces the commutation or transportation investment costs of both enterprise professional services personnel or Customer Engineer (CE) visit to remote geographically located zero-client SSTs 110 also.
4. Agentless remote access feature of middleware environment 130 (with inclusion of 2 above), which will offer ease to enterprise support or professional services to either troubleshoot or deployment of VM instances 120 to virtualized and cloud-based environments.

The novel proposed zero-client SST 110 combined with the cloud-based VM instance 120 and middleware environment 130 delivered middleware services securely downloads and loads the hosting environment on memory only of SST VM instance 120 and whenever there is communication break or unauthorized device plug-in (using unauthorized peripheral devices 111) or physical security breach of zero-client SST 110, SST 110 will detect immediately and go in "Out of Service" mode to cease any further operation till the connection is restored to avoid any transaction loss of customer and enterprise. The zero-client SST 110 processes a background agent 114 that independently processes, which is used to perform the diagnose of the zero-client SST peripheral devices 111 remotely from either customer office or via authorized access to enterprise support representative(s) whenever any driver error or fault is detected to minimize the investment cost or the enterprise's support expenditure and real-time troubleshooting of issue to meet Service-Level Agreement (SLA) deliveries.

Again, "zero-client" refers to an ultra-thin client that has its OS hosted remotely and that lacks any OS.

In an embodiment, the SST is a self-grocery checkout, an ATM, or a kiosk.

In an embodiment, the cloud-based server associated with each SST VM instance 120 is hosted by the corresponding enterprise's data center.

In an embodiment, the cloud-based server associated with each SST VM instance 120 is hosted by a same cloud as the middleware environment 130.

These and other embodiments are now discussed with reference to the FIGS. 2-3.

Figure 2:
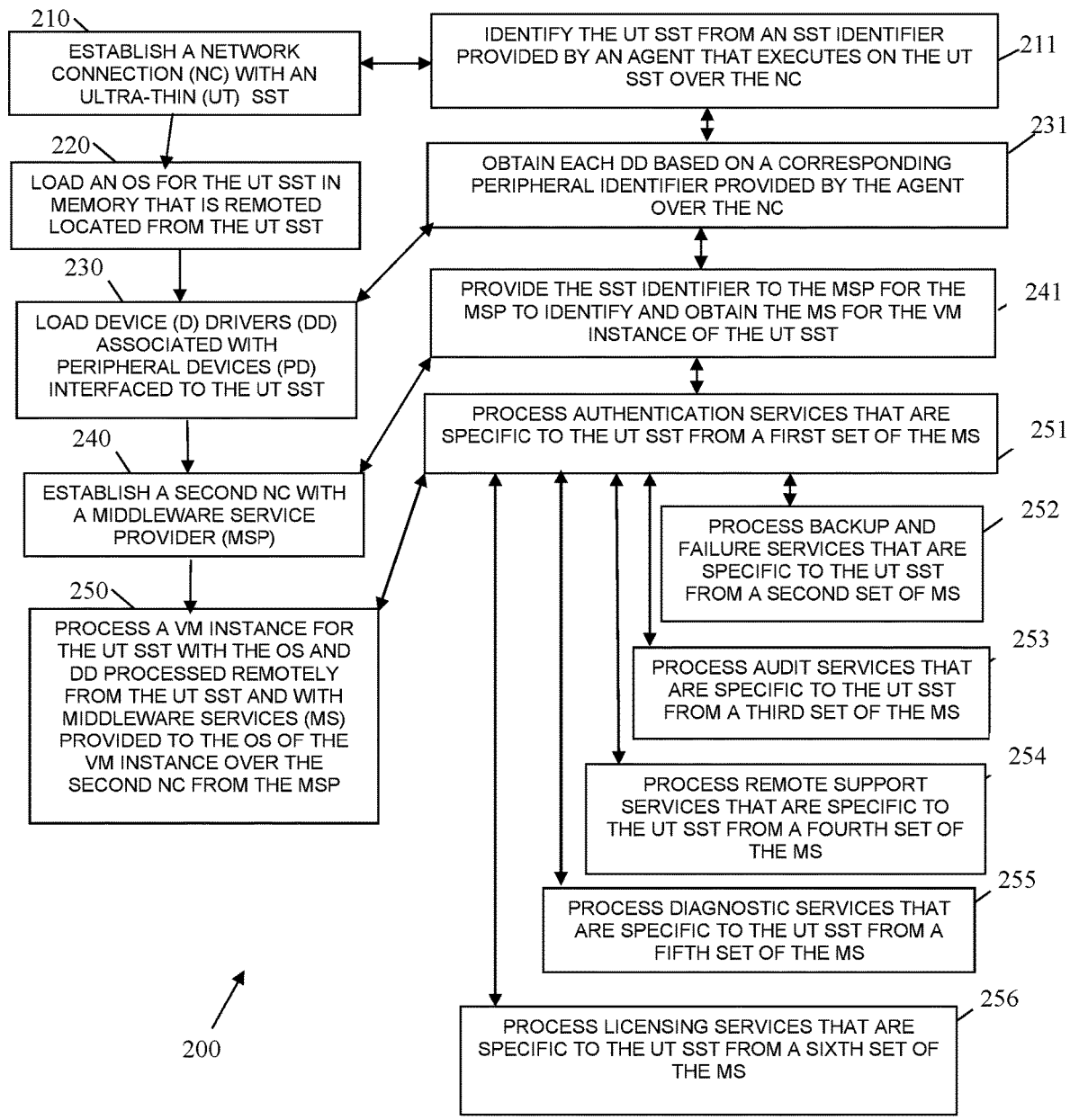
FIG. 2 is a diagram of a method for processing a zero-client SST with middleware delivered services, according to an example embodiment.

FIG. 2 is a diagram of a method 200 for a processing a zero-client SST with middleware delivered services, according to an example embodiment. The software module(s) that implements the method 200 is referred to as a "cloud-based VM manager." The cloud-based VM manager is implemented as executable instructions programmed and residing within memory and/or a non-transitory computer-readable (processor-readable) storage medium and executed by one or more processors of a cloud/server. The processor(s) of the cloud/server that executes the cloud-based VM manager are specifically configured and programmed to process the cloud-based VM manager. The cloud-based VM manager has access to one or more network connections during its processing. The network connections can be wired, wireless, or a combination of wired and wireless.

In an embodiment, the cloud-based VM manager executes on a hosted cloud environment having instances of SST VMs 120. In an embodiment, the cloud-based VM manager executes on one or more servers of an enterprise data center.

In an embodiment, the cloud-based VM manager is all or some combination of transaction manager SST VM instances 120 comprise the processor 121, the OS 122, and the peripheral drivers 123.

In an embodiment, the cloud-based VM manager is a VM hypervisor that manages multiple SST VM instances for multiple ultra-thin clients 110.

At 210, the cloud-based VM manager establishes a network connection with an ultra-thin SST.

In an embodiment, at 211, the cloud-based VM manager identifies the ultra-thin SST from an SST identifier provided by an agent that executes on the ultra-thin SST over the network connection.

At 220, the cloud-based VM manager loads an OS for the ultra-thin SST in memory that is remoted located from the ultra-thin SST.

At 230, the cloud-based VM manager loads device drivers associated with peripheral devices interfaced to the ultra-thin SST.

In an embodiment of 211 and 230, at 231, the cloud-based VM manager obtains each device driver based on a corresponding peripheral identifier provided by the agent over the network connection.

At 240, the cloud-based VM manager establishes a second network connection with a middleware service provider.

In an embodiment of 231 and 240, at 241, the cloud-based VM manager provides the SST identifier to the middleware service provider for the middleware service provider to identify and obtain the middleware services for the VM instance of the ultra-thin SST.

At 250, the cloud-based VM manager processes a VM instance for the ultra-thin SST with the OS and device drivers processed remotely from the ultra-thin SST and with middleware services provided to the OS of the VM instance over the second network connection.

In an embodiment of 241 and 250, at 251, the cloud-based VM manager processes authentication services that are specific to the ultra-thin SST from a first set of the middleware services.

In an embodiment of 251, at 252, the cloud-based VM manager processes backup and failure services that are specific to the ultra-thin SST from a second set of the middleware services.

In an embodiment of 251, at 253, the cloud-based VM manager processes audit services that are specific to the ultra-thin SST from a third set of the middleware services.

In an embodiment of 251, at 254, the cloud-based VM manager processes remote support services that are specific to the ultra-thin SST from a fourth set of the middleware services.

In an embodiment of 251, at 255, the cloud-based VM manager processes diagnostic services that are specific to the ultra-thin SST from a fifth set of the middleware services.

In an embodiment of 251, at 256, the cloud-based VM manager processes licensing services that are specific to the ultra-thin SST from a sixth set of the middleware services.

Figure 3:
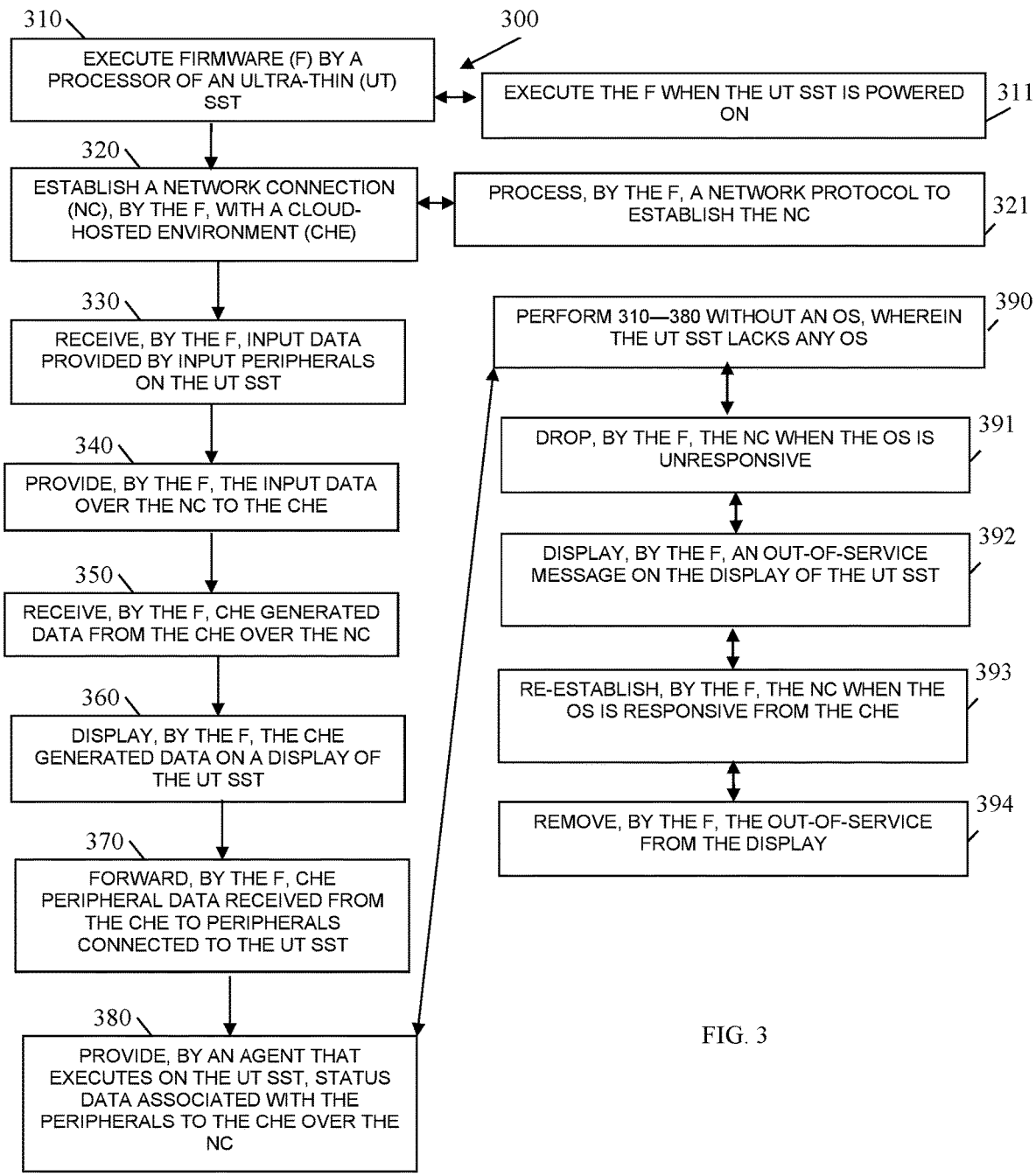
FIG. 3 is a diagram of another method for a zero-client SST with middleware delivered services, according to an example embodiment.

FIG. 3 is a diagram of another method 300 for processing a zero-client SST with middleware delivered services, according to an example embodiment. The software module(s) that implements the method 300 is referred to as a "ultra-thin client manager." The ultra-thin client manager is implemented as executable instructions/firmware programmed and residing within memory and/or a non-transitory computer-readable (processor-readable) storage medium and executed by one or more processors of an ultra-thin client machine. The processors that execute the ultra-thin client manager are specifically configured and programmed to process the ultra-thin client manager. The ultra-thin client manager has access to one or more network connections during its processing. The network connections can be wired, wireless, or a combination of wired and wireless.

In an embodiment, the ultra-thin client manager executes on an ultra-thin SST 110.

In an embodiment, the middleware VM services manager is all of or some combination of firmware and agent 114.

The ultra-thin client manager interacts with the OS 123 of SST VM instances 120 provided for ultra-thin SSTs 110.

At 310, the ultra-thin client manager executes firmware on a processor of an ultra-thin SST.

In an embodiment, at 311, the ultra-thin client manager executes the firmware when the ultra-thin SST is powered on.

At 320, the ultra-thin client manager establishes, by the firmware, a network connection with a cloud-hosted environment.

In an embodiment, at 321, the ultra-thin client manager executes a network protocol to establish the network connection.

At 330, the ultra-thin client manager receives, by the firmware input data provided by input peripherals on the ultra-thin SST.

At 340, the ultra-thin client manager provides, by the firmware, the input data over the network connection to the cloud-hosted environment.

At 350, the ultra-thin client manager receives, by the firmware, cloud-hosted environment generated data from the cloud-hosted environment over the network connection.

At 360, the ultra-thin client manager displays, by the firmware, the cloud-hosted environment generated data on a display of the ultra-thin SST.

At 370, the ultra-thin client manager forwards, by the firmware cloud-hosted environment peripheral data received from the cloud-hosted environment to peripherals connected to the ultra-thin SST.

At 380, the ultra-thin client manager provides, by an agent that executes on the ultra-thin SST, status data associated with the peripherals to the cloud-hosted environment over the network connection.

In an embodiment, at 390, the ultra-thin client manager processes 310-380 without an OS; the ultra-thin SST lacks any OS.

In an embodiment of 390, at 391, the ultra-thin client manager drops, by the firmware, the network connection when the OS is unresponsive.

In an embodiment of 391, at 392, the ultra-thin client manager displays, by the firmware, an Out-of-service message on the display of the ultra-thin SST.

In an embodiment of 392, at 393, the ultra-thin client manager re-establishes, by the firmware, the network connection when the OS is responsive from the cloud-hosted environment.

In an embodiment of 393, at 394, the ultra-thin client manager removes, by the firmware, the Out-of-service from the display.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   establishing a network connection with firmware of an ultra-thin Self-Service Terminal (SST);
   initiating a background agent on the ultra-thin SST to perform diagnostics on peripheral devices interfaced to the ultra-thin SST remotely;
   loading an Operating System (OS) for the ultra-thin SST in memory that is remotely located from the ultra-thin SST within a first-hosted environment when the ultra-thin SST is powered on;
   loading device drivers associated with the peripheral devices within the first hosted-environment;
   establishing a second network connection with a middleware service provider associated with a second-hosted environment;
   requesting, by the OS, middleware services to extend features and functions of the OS over the second network connection;
   processing a Virtual Machine (VM) instance for the ultra-thin SST with the OS and device drivers processed remotely from the ultra-thin SST and with the middleware services provided to the OS of the VM instance over the second network connection, wherein the middleware services are applications that provided the features and the functions which were originally unavailable to the OS of the VM instance from the second network connection;
   forwarding peripheral data received from the peripheral devices of the ultra-thin SST to the first-hosted environment over the network connection;
   presenting display data received from the first-hosted environment over the network connection on a terminal display of the ultra-thin SST;
   processing transaction applications within the OS of the first hosted environment, the transaction applications utilize the peripherals of the ultra-thin SST and utilize the middleware services during transactions being driven by the peripheral data;
   providing the middleware services to the OS of the VM instance over the second connection from the second-hosted environment to the first-hosted environment; and
   detecting, by the background agent, any unauthorized peripheral connection made on the ultra-thin SST and ceasing any further operations associated with the ultra-thin SST based on a detected unauthorized peripheral connection;
   performing the method without an OS, wherein the ultra-thin SST lacks any OS; and wherein performing further includes dropping, by the firmware, the network connection when the OS is unresponsive.

2. The method of claim 1, wherein establishing the network connection further includes identifying the ultra-thin SST from an SST identifier provided by the background agent.

3. The method of claim 2, wherein loading the device drivers further includes obtaining each device driver based on a corresponding peripheral identifier provided by the background agent over the network connection.

4. The method of claim 3, wherein establishing the second network connection further includes providing the SST identifier to the middleware service provider for the middleware service provider to identify and obtain the middleware services for the VM instance of the ultra-thin SST.

5. The method of claim 4, wherein processing further includes processing authentication services that are specific to the ultra-thin SST from a first set of the middleware services.

6. The method of claim 5, wherein processing further includes processing backup and failure services that are specific to the ultra-thin SST from a second set of the middleware services.

7. The method of claim 6, wherein processing further includes processing audit services that are specific to the ultra-thin SST from a third set of the middleware services.

8. The method of claim 7, wherein processing further includes processing remote support services that are specific to the ultra-thin SST from a fourth set of the middleware services.

9. The method of claim 8, wherein processing further includes processing diagnostic services that are specific to the ultra-thin SST from a fifth set of the middleware services.

10. The method of claim 1, wherein processing further includes processing licensing services that are specific to the ultra-thin SST from a sixth set of the middleware services.

11. A system, comprising:
    an ultra-thin Self-Service Terminal (SST) that lacks a client Operating System (OS), the ultra-thin SST comprising a terminal processor and a terminal non-transitory computer-readable storage medium comprising firmware;

a first-hosted environment that is remotely located from the ultra-thin SST, wherein the first-hosted environment configured to create a Virtual Machine (VM) instance for the ultra-thin SST and the first-hosted environment comprising at least one first-hosted processor and a first-hosted non-transitory computer-readable storage environment comprising executable instructions representing an OS for the ultra-thin SST and peripheral drivers for peripherals interfaced to the ultra-thin SST;

a second-hosted environment that is remotely located from the ultra-thin SST and the first-hosted environment comprising a second-hosted processor and a second-hosted non-transitory computer-readable storage medium having second-hosted executable instructions representing middleware services provided to the OS of the second-hosted environment;

the firmware when executed by the terminal processor from the terminal non-transitory computer-readable storage medium causes the terminal processor to perform processing comprising:

establish a network connection to the first-hosted environment when the ultra-thin SST is powered on;

forward peripheral data received from the peripherals to the first-hosted environment over the network connection;

forward peripheral instructions received from the first-hosted environment over the network connection to the peripherals;

present display data received from the first-hosted environment over the network connection on a terminal display of the ultra-thin SST;

initiating an agent as a background process on the ultra-thin SST to at least perform diagnostics on the peripherals interfaced to the ultra-thin SST remotely; and detecting, by the agent, any unauthorized peripheral connection made on the ultra-thin SST and ceasing any further operations associated with the ultra-thin SST based on a detected unauthorized peripheral connection;

the OS and peripheral drivers when executed by the first-hosted processor from the first-hosted non-transitory computer-readable storage medium causes the first-hosted processor to perform processing comprising:

loading and initiating the OS for the VM of the ultra-thin SST when the network connection is established to the firmware of the ultra-thin SST;

loading the peripheral drivers;

establishing a second network connection to the second-hosted environment;

requesting the middleware services from the second network connection to extend features and functions of the OS over the second network connection through the middleware services; and processing transaction applications within the OS, wherein the transaction applications utilize the peripherals of the ultra-thin SST and the middleware services during transactions being driven by the peripheral data;

the middleware services when executed by the second-hosted processor from the second-hosted non-transitory computer-readable storage medium causes the second-hosted processor to perform processing comprising:

providing the middleware services to the OS of the VM over the second network connection;

wherein the middleware services are applications that provide the features and the functions from the OS, wherein the features and functions are originally unavailable from the OS of the VM until requested by the OS from the first-hosted environment instance;

and dropping, by the firmware, the network connection when the OS is unresponsive.

12. The system of claim 11, wherein the ultra-thin SST is an ultra-thin Automated Teller Machine (ATM) that conducts the transactions from the peripherals through the VM instance of the first-hosted environment and the middleware services of the second-hosted environment.

* * * * *